United States Patent
Liaqat et al.

(10) Patent No.: US 10,894,617 B2
(45) Date of Patent: Jan. 19, 2021

(54) AIRCRAFT ASSEMBLY LOCATING TOOL

(71) Applicant: AIRBUS OPERATIONS LIMITED, Bristol (GB)

(72) Inventors: Amer Liaqat, Bristol (GB); David Tomlinson, Bristol (GB); Stuart Vass, Bristol (GB); Christopher Hannon, Bristol (GB); Harry Parsonage, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 181 days.

(21) Appl. No.: 16/150,741

(22) Filed: Oct. 3, 2018

(65) Prior Publication Data

US 2019/0100334 A1    Apr. 4, 2019

(30) Foreign Application Priority Data

Oct. 4, 2017  (GB) .................................. 1716189.4

(51) Int. Cl.
  *B64F 5/10*  (2017.01)
  *B25B 11/02*  (2006.01)
(52) U.S. Cl.
  CPC ............... *B64F 5/10* (2017.01); *B25B 11/02* (2013.01)
(58) Field of Classification Search
  CPC . B64F 5/10; B25B 11/00; B25B 11/02; B23Q 3/00
  USPC ..... 29/271, 281.1, 281.5, 281.6; 269/45, 55, 269/271
  See application file for complete search history.

(56) References Cited

U.S. PATENT DOCUMENTS 9,014,836 B2 *  4/2015  Stone ...................... B64F 5/50
                                                   700/114
2015/0307210 A1  10/2015  De Oliveira et al.

FOREIGN PATENT DOCUMENTS

| CN | 101362514 | 2/2009 |
| CN | 104985447 | 10/2015 |
| CN | 205184603 | 4/2016 |

(Continued)

OTHER PUBLICATIONS

European Search Report for European Application No. 18193812.7, dated Mar. 1, 2019, 11 pages.

(Continued)

*Primary Examiner* — Lee D Wilson
*Assistant Examiner* — Alberto Saenz
(74) *Attorney, Agent, or Firm* — Nixon & Vanderhye P.C.

(57) ABSTRACT

An aircraft assembly locating tool for locating an aircraft component during assembly of an aircraft is disclosed. The aircraft assembly locating tool has a base tool part and a positionable tool part. The base tool part is configured to mount on a support. An interface arrangement arranged to mount with an aircraft component is configured to move with the positionable tool part relative to the base tool part. The positionable tool part is movable relative to the base tool part. When mounted on the aircraft assembly locating tool, the aircraft component is configured to move with the positionable tool part relative to the base tool part. The tool also has a locking arrangement configured to selectively lock the positionable tool part in a position relative to the base tool part, and an adjustment arrangement configured to act on the positionable tool part to adjust the position of the positionable tool part relative to the base tool part.

13 Claims, 6 Drawing Sheets

(56) References Cited

FOREIGN PATENT DOCUMENTS

| | | | | |
|---|---|---|---|---|
| CN | 106272174 | 1/2017 | | |
| CN | 106392947 | 2/2017 | | |
| EP | 2604524 A2 | 6/2013 | | |
| EP | 2604524 A3 | 5/2016 | | |
| WO | 2011/046482 | 4/2011 | | |
| WO | WO-2011046482 A1 * | 4/2011 | ................ | B64F 5/10 |
| WO | 2016043675 | 3/2016 | | |

OTHER PUBLICATIONS

Combined Search and Examination Report for GB 1716189.4, dated Mar. 20, 2018, 10 pages.

* cited by examiner

AIRCRAFT ASSEMBLY LOCATING TOOL

CROSS RELATED APPLICATION

This application claims priority to United Kingdom (GB) patent application 1716189.4, filed Oct. 4, 2017, the entire contents of which is hereby incorporated by reference.

FIELD OF THE INVENTION

The present invention relates to an aircraft assembly locating tool. In particular, the present invention relates to an aircraft assembly locating tool for locating an aircraft component during assembly of an aircraft, and a fixture. The present invention also relates to a mounting assembly and an aircraft assembly fixture.

BACKGROUND OF THE INVENTION

Aircraft assembly fixtures are used during the assembly of aircraft. The fixtures are used to hold components and assemblies of part of the aircraft during assembly with other components or assemblies. Due to the required tolerances and structural integrity required between components and assemblies of an aircraft, it is important that the components or assemblies to be assembled are held in a highly accurate position and orientation during the aircraft build. The fixtures are also regularly checked and recertified to ensure that the orientation and positioning of components and assemblies held by the or each fixture conform to predetermined measurements.

An aircraft assembly fixture typically includes a frame to which an aircraft assembly, such as a wing box, is mounted using locating tools. Such locating tools are dedicated rigid members which extend between the frame and the aircraft assembly. Such locating tools are required to locate the assembly to an accurate tolerance whilst supporting large loads through each locating tool. As such, each locating tool is typically a bespoke solid component.

SUMMARY OF THE INVENTION

According to a first aspect of the invention, there is provided an aircraft assembly locating tool for locating an aircraft component comprising a base tool part configured to mount on a support, a positionable tool part movable relative to the base tool part, an interface arrangement configured to mount with an aircraft component, the interface arrangement being configured to move with the positionable tool part relative to the base tool part; an adjustment arrangement configured to act on the positionable tool part to adjust the position of the positionable tool part relative to the base tool part; and a locking arrangement configured to selectively lock the positionable tool part in a position relative to the base tool part.

With this arrangement it is possible to set the locating of the interface arrangement, and therefore the aircraft component to a desired tolerance and maximize a load carrying capability.

The adjustment arrangement may be configured to limit the degrees of freedom of adjustment of the position of the positionable tool part relative to the base tool part.

As such, accurate locating of the aircraft assembly may be achieved.

The adjustment arrangement may be configured to adjust the position of the positionable tool part relative to the base tool part along one degree of freedom.

The adjustment arrangement may be configured to adjust the position of the second tool part relative to the base tool part along a translational movement or a yaw movement.

The adjustment arrangement may comprise a guide arrangement configured to guide movement of the positionable tool part relative to the base tool part.

The locking arrangement may be configured to act in a perpendicular direction to the adjustment arrangement.

The base tool part may comprise a locating surface parallel to which the adjustment arrangement is configured to adjust the position of the positionable tool part.

The locking arrangement may be configured to urge the positionable tool part against the locating surface.

The locking arrangement may be a primary locking arrangement configured to urge the positionable tool part against the locating surface and the tool may comprise a secondary locking arrangement configured to act in a perpendicular direction to the primary locking arrangement and the adjustment arrangement.

The adjustment arrangement may be configured to adjust the position of the positionable tool part relative to the base tool part along a pitch and/or roll movement.

The locking arrangement may be configured to act in a parallel direction to the adjustment arrangement.

The base tool part may comprise a locating surface, perpendicular to which the adjustment arrangement is configured to adjust the position of the positionable tool part.

The locking arrangement may be configured to act against the adjustment arrangement.

The adjustment arrangement may be configured to act on the locating surface to urge the positionable tool part away from the locating surface.

The locking arrangement may be configured to urge the positionable tool part against the locating surface.

The locking arrangement may be a primary locking arrangement configured to urge the positionable tool part against the locating surface and the tool may comprise a secondary locking arrangement configured to act in a perpendicular direction to the primary locking arrangement and the adjustment arrangement.

The adjustment arrangement may comprise at least one urging element configured to act on one of the base and positionable tool parts which is threadingly engaged with the other of the base and positionable tool parts.

The base tool part and the positionable tool part may rigid plates.

The base tool part may be a first tool part and the positionable tool part may be a second tool part, and the aircraft assembly locating tool may comprise a third tool part movable relative to the first and second tool parts, wherein the interface arrangement is configured to move with the third tool part relative to the second tool part.

The locking arrangement may be a second tool part locking arrangement and the aircraft assembly locating tool may comprise a third tool part locking arrangement configured to selectively lock the third tool part in a position relative to the second tool part.

The adjustment arrangement may be a second tool part adjustment arrangement, and the aircraft assembly locating tool may comprise a third tool part adjustment arrangement configured to act on the third tool part to adjust the position of the third tool part relative to the second tool part.

The third tool part adjustment arrangement may be configured to limit the degrees of freedom of adjustment of the position of the third tool part relative to the second tool part along one degree of freedom.

The second tool part adjustment arrangement may be configured to adjust the position of the second tool part relative to the first tool part along one of a translational movement and a yaw movement, and the third tool part adjustment arrangement may be configured to adjust the position of the third tool part relative to the second tool part along the other of a translational movement and a yaw movement.

The aircraft assembly locating tool may comprise a fourth tool part movable relative to the first, second and third tool parts, wherein the interface arrangement is configured to move with the fourth tool part relative to the third tool part.

The aircraft assembly locating tool may comprise a fourth tool part locking arrangement configured to selectively lock the fourth tool part in a position relative to the third tool part. The aircraft assembly locating tool may comprise a fourth tool part adjustment arrangement configured to act on the fourth tool part to adjust the position of the fourth tool part relative to the third tool part.

The fourth tool part adjustment arrangement may be configured to adjust the position of the fourth tool part relative to the third tool part along a pitch and/or roll movement.

The aircraft assembly locating tool may comprise a mount configured to mount the base tool part on the support, wherein the adjustment arrangement is a second tool part adjustment arrangement and the mount comprises a first tool part adjustment arrangement configured to adjust the position of the base tool part relative to the support along one degree of freedom.

According to an aspect of the invention, there is provided a mounting assembly comprising the aircraft assembly locating tool as set out above with the interface arrangement comprising a coupling tool configured to couple the positionable tool part to the aircraft component.

According to an aspect of the invention, there is provided an aircraft assembly fixture for locating an aircraft component during assembly comprising the aircraft assembly locating tool as set out above, and/or the mounting assembly as set out above.

According to an aspect of the invention, there is provided an aircraft assembly locating tool for locating an aircraft component during assembly, comprising a first tool part configured to mount on a support, a second tool part on the first tool part, a third tool part on the second tool part, and an interface arrangement configured to mount with an aircraft component, wherein the interface arrangement is configured to move with the third tool part, and wherein the first, second and third tool parts are each configured to move relative to each other in a direction along one degree of freedom.

The first, second and third tool parts may be each configured to move relative to each other in a direction along different degrees of freedom.

The aircraft assembly locating tool may comprise a fourth tool part on the third tool part, wherein the interface arrangement is on the fourth tool part.

The fourth tool part may be configured to rotate relative to the first, second and third tool parts about an axis parallel to a degree of freedom of at least one of the first, second and third tool parts.

According to an aspect of the invention, there is provided an aircraft assembly locating tool for locating an aircraft component comprising a plurality of plates, wherein each plate is movable relative to another plate.

The aircraft assembly may comprise a locking arrangement configured to independently lock each plate relative to each other, wherein each plate is movable relative to each other plate, and an adjustment arrangement configured to independently adjust each plate relative to the or each adjacent plate.

The plates may be tiered.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
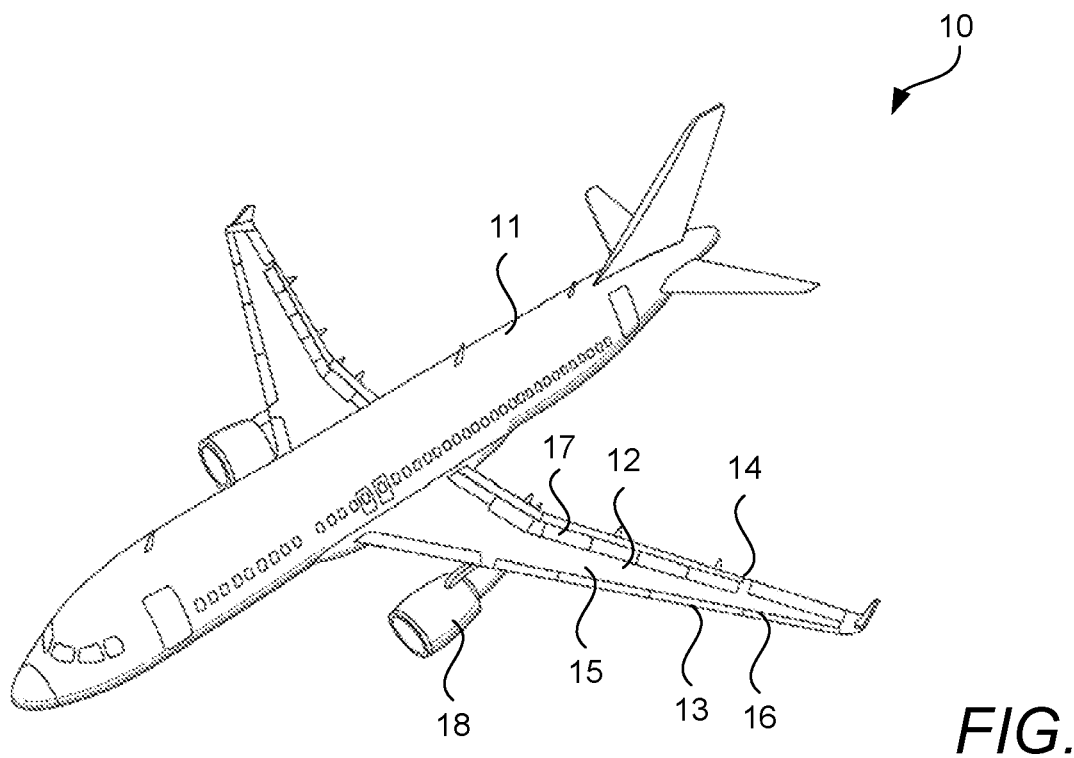
FIG. 1 is a schematic perspective view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planned formed shapes and profiles depending on the particular application. The wing 12 has a leading edge 13 and a trailing edge 14. The wing 12 comprises a wing box 15 formed by a wing box assembly. The wing box 15 forms the main body of the wing 12. The wing 12 also comprises a leading edge assembly 16 and a trailing edge assembly 17. The leading edge assembly 16 is at a front end of the wing box 15 and the trailing edge assembly 17 is at a rear end of the wing box 15. An engine 18 is mounted to each wing 12.

In the following description, the term "front" refers to components towards the leading edge of the wing, and the term "rear" refers to components towards the trailing edge of the wing. The terms "forward" and "rearward" shall be construed accordingly. The position of features may be construed relative to other components, for example a forward component may be disposed on a forward side of another component, but towards the rear of the vehicle. Similarly, the terms "upper", "lower", "above" and "below" may be used to construe the position of features relative to other components.

In the following description, the term "assembly" refers to two or more assembled components. The term "sub-assembly" refers to two or more assembled components which together with one or more further components forms an assembly. A sub-assembly may be two or more assembled components which during manufacture of an aircraft or part of an aircraft are assembled together with one or more further components.

Figure 2:
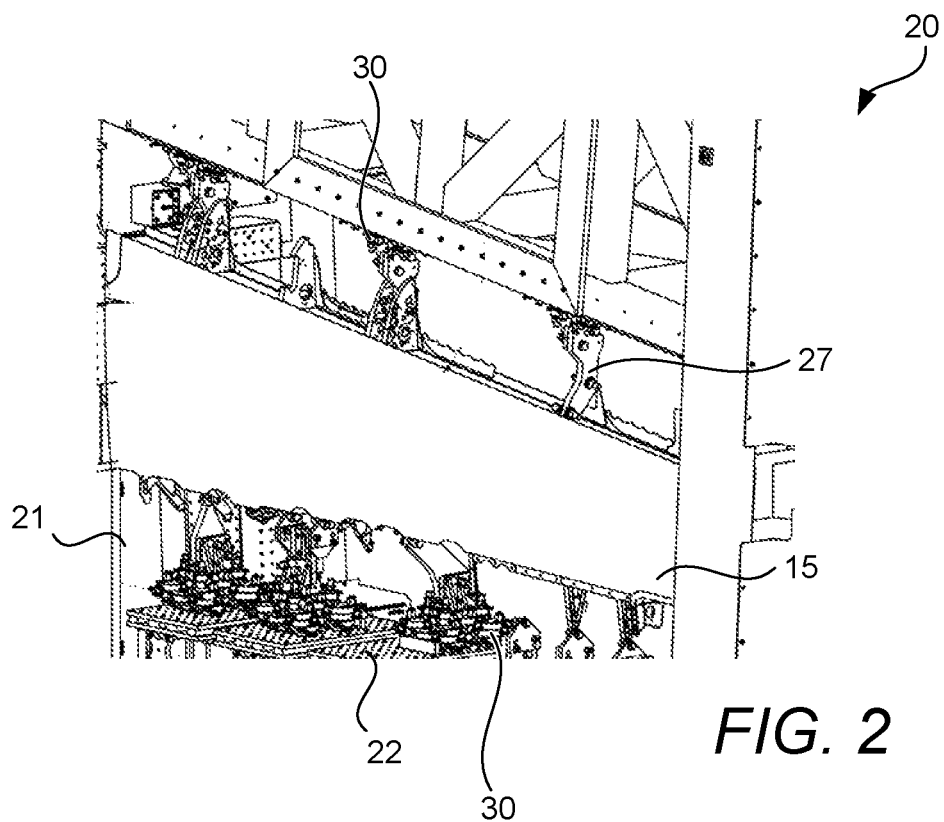
FIG. 2 is a partial schematic perspective view of an aircraft assembly fixture with multiple aircraft assembly locating tools locating and holding an aircraft wing box.

An aircraft assembly fixture 20 is shown in FIG. 2. The fixture 20 is configured to hold the wing box 15 of one of the wings 12 during assembly. The fixture 20 comprises a frame 21 and aircraft assembly locating tools 30. The aircraft assembly locating tools 30 hold the wing box 15 on the frame 21. As such, the wing box 15 is held in a predetermined position and orientation. The frame 21 is configured to support the wing box 15. The frame 21 comprises a plurality of supports 22. The aircraft assembly locating tools 30 are on the supports 22.

Although the embodiments described herein are described with reference to the wing box 15, it will be understood that alternative aircraft assemblies may be assembled using the fixture 20, and held by the tools 30. For example, the assembly to be assembled may be a sub-assembly of the wing box 15, the wing 12, or an alternative part of the aircraft 10, such as a tail plane or the fuselage 11. The tool 30 or tools 30 may hold a single component during assembly, or an assembly of components.

The number of tools 30 and the number of supports 22 may vary. For example, one tool 30 may be used or a plurality of tools 30. The or each support 22 may hold one tool 30 or two or more tools 30.

In the present embodiment, the fixture 20 is shown supporting the wing box 15. The wing box 15 is disposed in a substantially vertical arrangement, however it will be understood that the fixture 20 may hold the wing box 15 in a different orientation. The wing box 15 is held to enable assembly of the wing box 15, but may be held to enable assembly of another assembly with the wing box assembly.

Figure 6:
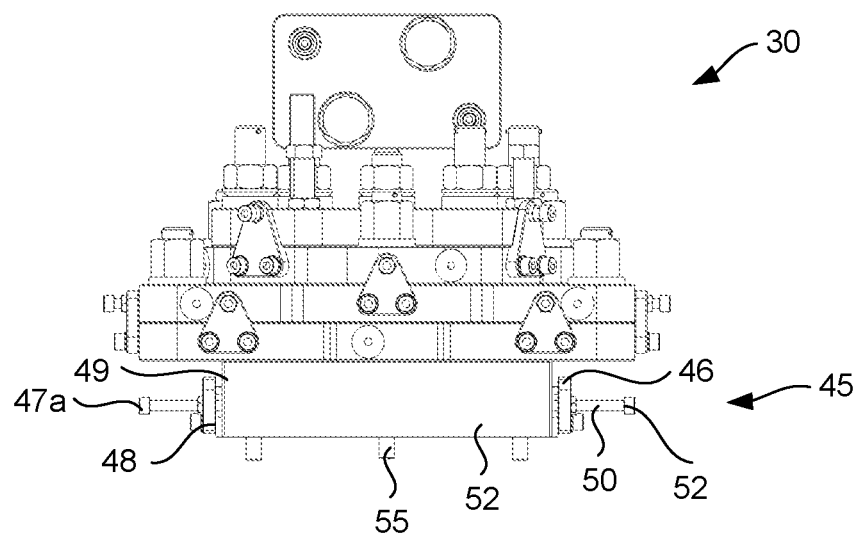
FIG. 6 is a side view of the aircraft assembly locating tool shown in FIG. 5.

Each support 22 comprises a mounting board or matrix board 23. The mounting board 23 comprises a grid of spaced mounting apertures (not shown) formed through the mounting board 23. The mounting apertures allow the mounting of one or more tools 30 on the mounting board 23. Fixings 25 (refer to FIG. 6) are used to mount the or each tool 30 to the mounting board 23.

An interface arrangement 26 is used to couple each tool 30 to the wing box 15 acting as an assembly. The interface arrangement 26 fixedly mounts the tool 30 to the wing box 15. In the arrangement shown in FIG. 2, tools 30 are arranged above and below the wing box 15. The tools 30 are therefore fixedly mounted along the leading edge and trailing edge sides of the wing box 15. When the tools 30 are fixedly mounted to the wing box 15, and the tools 30 are fixedly mounted to the frame 21, the wing box 15 is fixedly held in place in a static condition.

Figure 3:
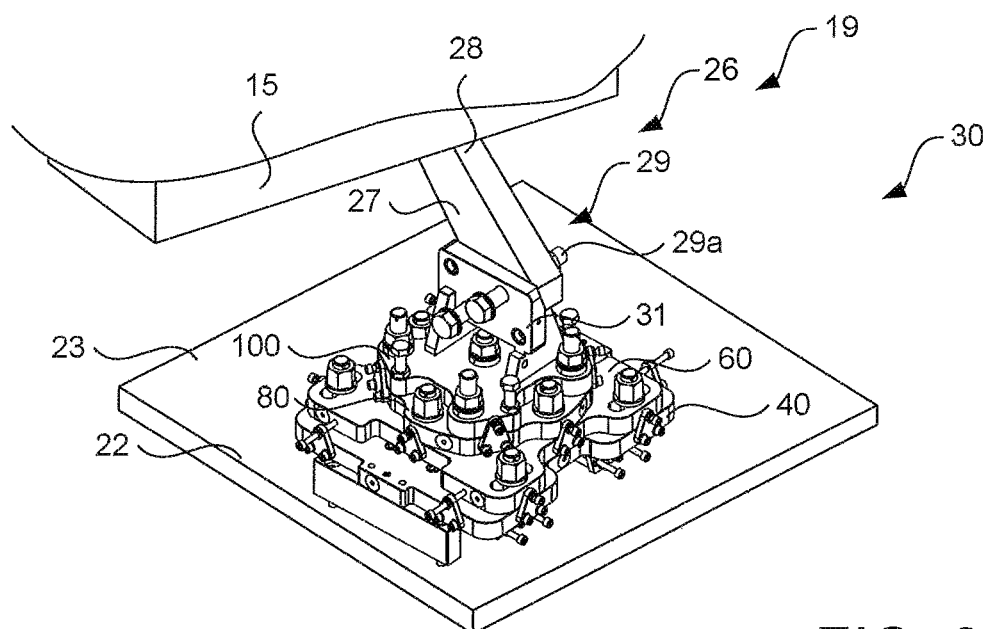
FIG. 3 is a schematic perspective view of one of the aircraft assembly locating tools shown in FIG. 2 on a support of the aircraft assembly fixture, coupled to part of the aircraft wing box by a coupling tool.
Figure 4:
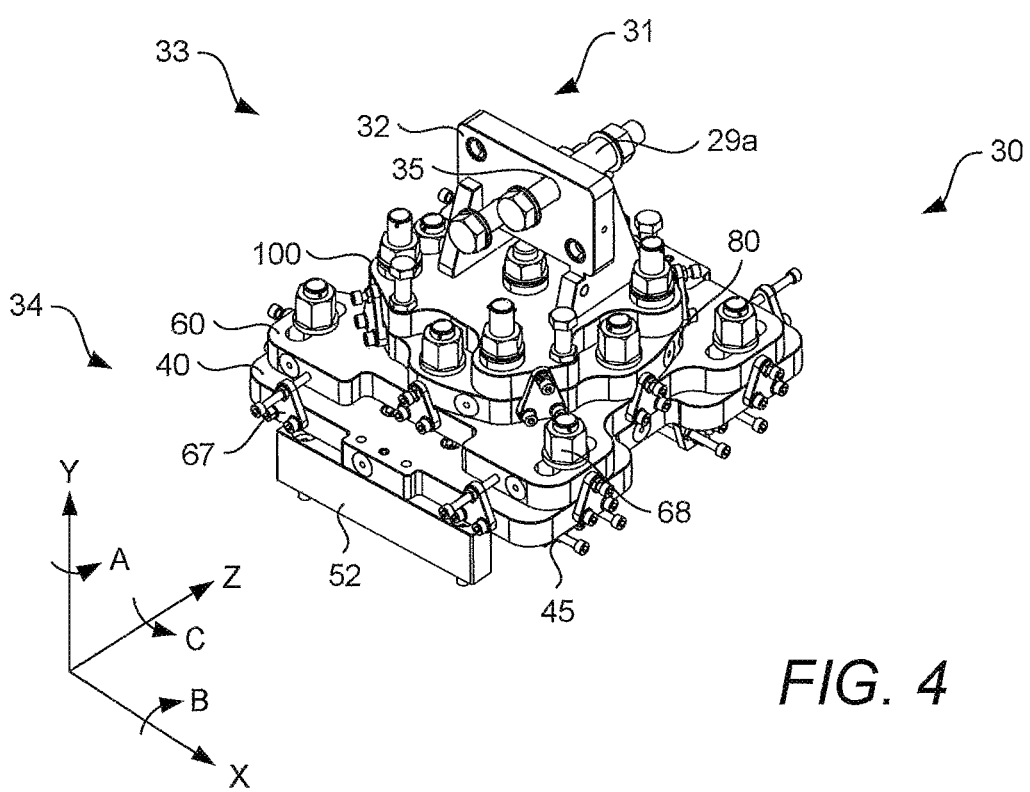
FIG. 4 is a perspective view of one of the aircraft assembly locating tools shown in FIG. 2.

Referring to FIGS. 3 to 6, one of the tools 30 is shown. As such, one tool 30 will be described. The tool 30 is shown in FIG. 3 mounted on the support 22. As such, the tool 30 is on the frame 21. The tool 30 is mounted to the wing box 15. The interface arrangement 26 couples the tool 30 to the wing box 15. The interface arrangement 26 mounts the tool 30 in a rigid configuration. That is, when coupled, the tool 30 is rigidly mounted to the wing box 15. The interface arrangement 26 comprises a coupling tool 27. The coupling tool 27 is a rigid component with an assembly fixing 28 at a first end and a tool fixing 29 at a second end. The coupling tool 27 comprises an elongate member. The coupling tool 27 mountable to the tool 30 is interchangeable with other coupling tools 27 in dependence on the location on the wing box 15 with which the tool 30 is disposed to mount. The coupling tool 27 may be a bespoke member. The assembly fixing 28 and tool fixing 29 in the present arrangement comprise bores in the elongate member configured to receive fixing bolts. Tool fixing bolts 29a are shown in FIGS. 3 and 4. The coupling tool 27 and the tool 30 together form a mounting assembly 19.

The tool 30 comprises an assembly end 33 and a support end 34. The tool 30 is mounted to the frame 21 at the support end 34 and the tool is mounted to the wing box 15 at the assembly end 33. The tool 30 comprises a coupler 31. The coupler 31 protrudes at the assembly end 33 of the tool 30. The coupler 31 is configured to be used to mount the tool 30 to the wing box 15.

The coupling tool 27 is mounted to the tool 30 by the coupler 31. The tool fixing bolts 29a extend through the coupler 31. The coupler 31 upstands from the tool 30. As such, mounting of the tool 30 is simplified. The coupler 31 in the present arrangement comprises an upstanding plate member 32 with fixing receiving holes 35. The tool 30 is attached to the support 22 at the support end 34. The fixings 25, which in the present arrangement include fixing bolts, mount the tool 30 in a rigid condition on the support 22.

Figure 5:
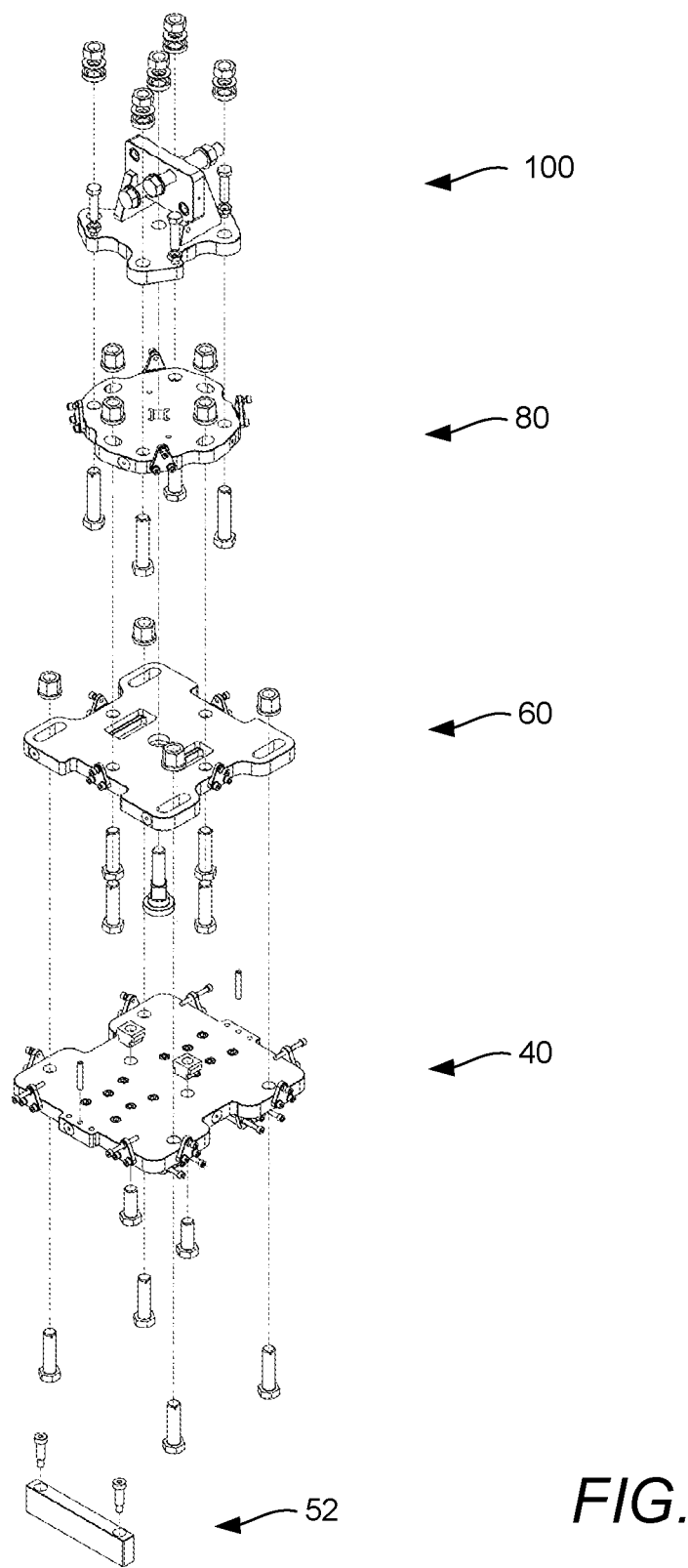
FIG. 5 is an exploded perspective view of the aircraft assembly locating tool shown in FIG. 4.

Referring to FIGS. 4 and 5, the tool 30 comprises a first tool part 40, a second tool part 60, a third tool part 80 and a fourth tool part 100. The tool parts 40, 60, 80, 100 are stacked plates. Each of the tool parts 40, 60, 80, 100 is manipulable relative to adjacent tool parts 40, 60, 80, 100 and is rigidly fixable in the manipulable position. The configuration of each of the tool parts 40, 60, 80, 100 may vary. The first tool part 60 is at the support end 34. The fourth tool part 100 is at the assembly end 33. The tool parts 40, 60, 80, 100 are arranged in the order: first tool part 40, second tool part 60, third tool part 80 and fourth tool part 100.

The tool parts 40, 60, 80, 100 are tiered. Each tool part 40, 60, 80, 100 is adjustable relative to the or each adjacent tool part 40, 60, 80, 100. As such, each tool part 40, 60, 80, 100 is positionable relative to the or each adjacent tool part 40, 60, 80, 100. Each tool part 40, 60, 80, 100 is lockable in a fixed arrangement relative to the or each adjacent tool part 40, 60, 80, 100. As such, each tool part 40, 60, 80, 100 is rigidly fixable relative to the or each adjacent tool part 40, 60, 80, 100. Each tool part 40, 60, 80, 100 is adjustable relative to each adjacent tool part 40, 60, 80, 100 along at least one degree of freedom.

In the present embodiment, the tool 30 comprises four tool parts 40, 60, 80, 100. However, it will be understood that the number of tool parts may differ. As described herein, the cooperation of the first tool part 40 with the support 20, for example, enables adjustment of the tool 20 along one degree of freedom. That is a translation in a direction parallel to the X axis as shown in FIG. 4. The cooperation of the second tool part 60 with the first tool part 40 enables adjustment of the tool 20 along one degree of freedom. That is a translation in a direction parallel to the Z axis as shown in FIG. 4. The cooperation of the third tool part 80 with the second tool part 60 enables adjustment of the tool 20 along one degree of freedom. That is a rotation A about an axis parallel to the Y axis as shown in FIG. 4. This movement is also known as yaw. The cooperation of the fourth tool part 100 with the third tool part 80 enables adjustment of the tool 20 along three different degrees of freedom. That is a translation in a direction parallel to the Y axis as shown in FIG. 4; a rotation B about an axis parallel to the X axis as shown in FIG. 4; and a rotation C about an axis parallel to the Z axis as shown in FIG. 4. The movements of rotation B and rotation C are also known as pitch and roll.

In one embodiment further tool parts may be provided to separate the degrees of freedom of movement provided by the cooperation of the fourth tool part 100 with the third tool part 80. In another embodiment, the number of tool parts may be reduced and the degrees of freedom of movement possible using the tool may be reduced. An advantage of the arrangement described herein with four tool parts 40, 60, 80, 100 is that the tool 30 is manipulable along six degrees of freedom.

The coupler 31 is on the fourth tool part 100. The coupler 31 is integrally formed with the fourth tool part 100 by welding or another fixing method. The coupler 31 in another embodiment may be mounted on the fourth tool part 100. The coupler 31 is in a rigid arrangement with the fourth tool part 100.

Figure 7:
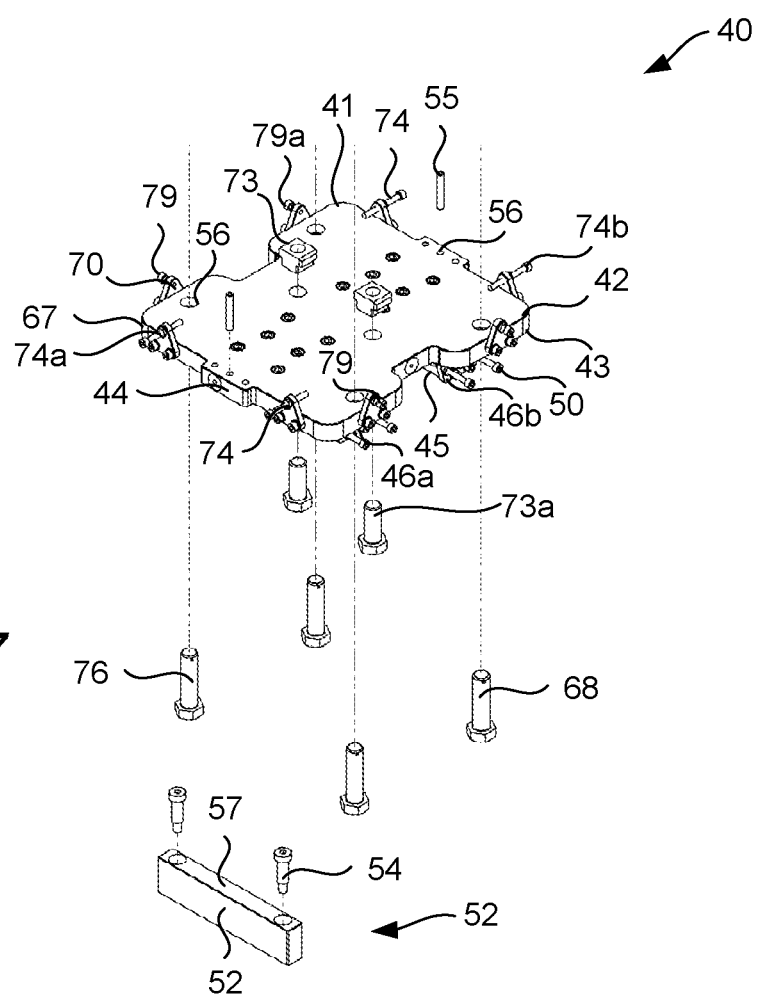
FIG. 7 is a perspective view of a first tool part of the aircraft assembly locating tool shown in FIG. 5 configured to mount on a support.

The first tool part 40 is shown in FIG. 7. The first tool part 40 comprises a rigid plate member 41 acting as a plate. The first tool part 40 is formed from a suitable material, such as stainless steel. The rigid plate member 41 has a locating surface 42 and a cooperating surface 43. The locating surfaces and cooperating surfaces of each tool part extend on parallel planes. The locating and cooperating surfaces 42, 43 form opposing faces of the first tool part 40. The first tool part 40 has a peripheral face 44. The peripheral face 44 extends between the locating and cooperating surfaces 42, 43. The plate member 41 has a thickness between the locating and cooperating surfaces 42, 43. The thickness of the plate member 41 is 30 mm and optionally in the range of 25 mm to 35 mm.

The tool 30 has a first tool part adjustment arrangement 45. The first tool part adjustment arrangement 45 is configured to act on the first tool part 40 to adjust the position of the first tool part 40 relative to the support 22. The first tool part 40 is mounted on the support 22 by the first tool part adjustment arrangement 45. The first tool part adjustment arrangement 45 comprises a rail arrangement 46 and first tool part adjusters 47.

The rail arrangement 46 acts as a guide. The rail arrangement 46 limits the degrees of freedom of movement of the first tool part 40. The rail arrangement 46 comprises two rails 46a, 46b. Each rail 46a, 46b comprises a mount portion 48 and a slidable portion 49. The slidable portion 49 is slidable on the mount portion 48. The rail 46 allows linear movement. The mount portion 48 is configured to fixedly mount to the support 22. The fixings 22 rigidly couple the rail 46 to the support 22.

The first tool part 40 is slidable along the rail arrangement 46. That is the first tool part 40 is slidable relative to the mount portion 48 in a direction along one degree of freedom. As such, when the rail arrangement 46 is mounted on the support 22, the first tool part 40 is limited to a translation in a direction parallel to the X axis shown in FIG. 4.

The first tool part adjusters 47 of the first tool part adjustment arrangement 45 act between the mount portion 48 and the slidable portion 49. The first tool part adjusters 47 limit linear movement of the first tool part 40. The first tool part adjusters 47 comprise urging elements 50 configurable to act to move the first tool part 40 relative to the support 22. The first tool part adjustment arrangement 45 comprises opposing first tool part adjusters 47a, 47b. The opposing first tool part adjusters 47a, 47b act to restrict movement in opposing directions. One first tool part adjuster 47a acts on one side of the rail arrangement 46 and another first tool part adjuster 47b acts on the opposing side.

In the present arrangement, each first tool part adjuster 47 comprises two urging elements 50. Separate adjusters 47 act on each rail 46a, 46b. However, it will be understood that the number and configuration of adjusters 47 may differ. Each urging element 50 is threadingly engaged on the mount portion 48 and has an urging end that acts on a receiving face on the slidable portion 49. As such, rotation of the urging element 50 causes the urging element 50 to act on the receiving face to urge the first tool part 40 to move in one direction, or causes the urging element 50 to move away from the receiving face to allow the first tool part 40 to move in the opposing direction.

When opposing urging elements 50 are configured to simultaneously act on opposing sides of the slidable portion 49, then movement of the first tool part 40 is prevented. Should opposing urging elements 50 be configured to simultaneously be spaced from opposing sides of the slidable portion 49, then free movement of the first tool part 40 is allowed.

The first part adjusters 47 may be omitted. The rail arrangement 46 allows for expansion and contraction of the wing box 15 in one direction during assembly of the wing box 15 and so prevents undue forces from being imparted in the structure.

The tool 30 has a first part locking arrangement 52. The first part locking arrangement 52 comprises a lock block 53 and lock dowels 55. In the present embodiment, the lock block 53 is a rigid block. The lock block 53 is fixedly mounted to the support 22. Bolts 54 mount the lock block 53 to the support 22. The lock dowels 55 act as locking elements. The lock dowels 55 are removably received in the lock block 53. The lock dowels 55 are receivable in dowel holes 56 in the first tool part 40. The dowel holes 56 extend through the rigid plate member 41 between the first tool part locating and cooperating surfaces 42, 43. The cooperating surface 43 locates against an upper side 57 of the lock block 53. The first part locking arrangement 52 is used to accurately locate the tool 30. During use, the lock dowels 55 are removable to allow for expansion and contraction of the wing box 15 in one direction during assembly of the wing box 15.

Figure 8:
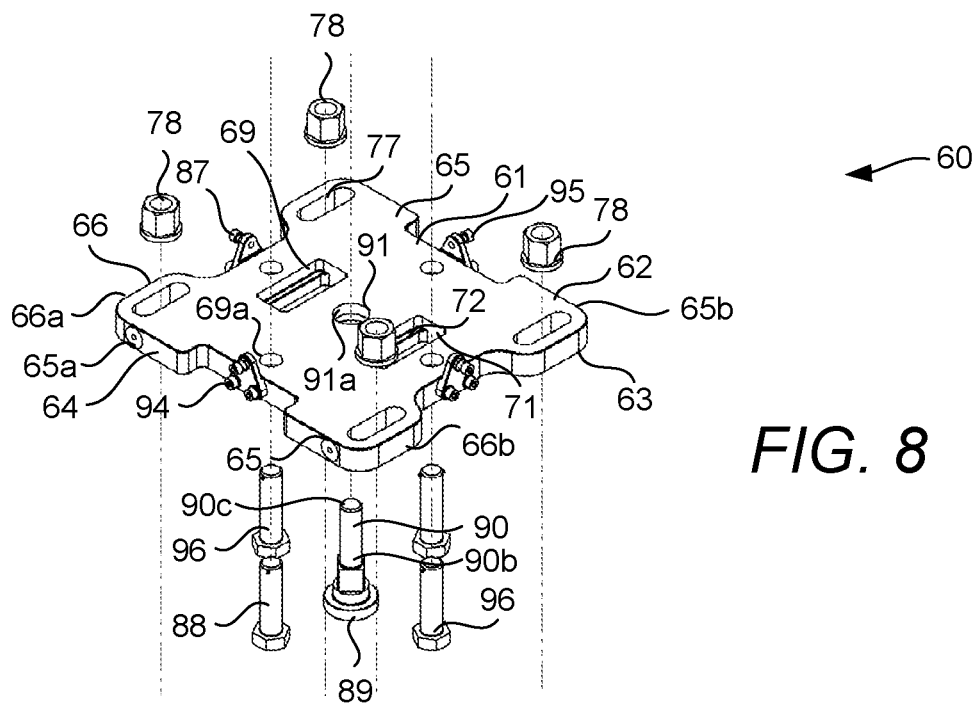
FIG. 8 is a perspective view of a second tool part of the aircraft assembly locating tool shown in FIG. 5.

Referring in particular to FIGS. 5, 7 and 8, the second tool part 60 comprises a second part rigid plate member 61. The second tool part 60 is formed from a suitable material, such as stainless steel. The rigid plate member 61 has a second part locating surface 62 and a second part cooperating surface 63. The locating and cooperating surfaces 62, 63 form opposing faces of the second tool part 60. The second tool part 60 has a second part peripheral face 64. The peripheral face 64 extends between the locating and cooperating surfaces 62, 63. The plate member 61 has a thickness between the locating and cooperating surfaces 62, 63. The thickness of the plate member 61 is 30 mm, and optionally in the range of 25 mm to 35 mm.

The tool 30 has a second tool part adjustment arrangement 67. The second tool part adjustment arrangement 67 is configured to act on the second tool part 60 to adjust the position of the second tool part 60 relative to the first tool part 40. The tool 30 has a second part locking arrangement 68. The second tool part locking arrangement 68 is configured to act on the second tool part 60 to prevent movement of the second tool part 60 relative to the first tool part 40. The second tool part 60 abuts with the first tool part 40. The second part cooperating surface 63 locates on the first part locating surface 43. The second part cooperating surface 63 and first part locating surface 43 cooperate to allow for the second part cooperating surface 63 to slide along the first part locating surface 43. In an embodiment, the contact surface of the second part cooperating surface 63 and first part locating surface 43 may vary in form.

The second tool part 60 has urging surfaces 65. The urging surfaces 65 comprise part of the second tool part adjustment arrangement 67. In the present embodiment, the peripheral face 64 of the second tool part 60 defines the urging surfaces 65. The second tool part 60 has opposing urging surfaces 65a, 65b along opposing side edges of the second tool part 60.

Perpendicular to the urging surfaces 65 are guide surfaces 66. The guide surfaces 66 are defined by the peripheral face 64. The second tool part 60 has opposing guide surfaces 66a, 66b along opposing side edges of the second tool part 60. The second tool part adjustment arrangement 67 comprises a second tool part guide arrangement 69. The second tool part guide arrangement 69 comprises second tool part guide flanges 70. The second tool part guide flanges 70 are on the first tool part 40. The second tool part guide flanges 70 protrude from the first part locating surface 43. The second tool part guide flanges 70 locate against the second tool part guide surfaces 66, such that the second tool part guide surfaces 66 are slidable thereagainst.

The second tool part guide arrangement 69 comprises second tool part guide channels 71. The guide channels 71 are formed in the second tool part 60. Two guide channels 71 are shown, however the number of guide channels 71 may vary. The guide channels 71 are elongate. A guide element 73 is received in each guide channel 71 and is slidable therealong. The guide elements 73 are fixedly mounted to the first tool part 40. Bolts 73a fix the guide elements 73. Each guide channel 71 comprises one or more guide shoulders 72. The guide shoulders 72 are received between a portion of the guide element 73 and the first tool part locating surface 42. As such, the guide elements 73 retain the second tool part 60 and guide relative movement.

The second tool part guide arrangement 69 restricts movement of the second tool part 60 relative to the first tool part 40 to one degree of freedom. As such, when the second tool part 60 is mounted on the first tool part 40, the second tool part 60 is limited to a translation in a direction parallel to the Z axis shown in FIG. 4. The second tool part 60 is slidable in a linear direction which is perpendicular to the allowable movement of the first tool part 40 relative to the support 22.

The second tool part adjustment arrangement 67 comprises second tool part adjusters 74. The second tool part adjusters 74 are configured to act on the second tool part 60 to cause selective movement of the second tool part 60 relative to the first tool part 40. The second tool part adjusters 74 act between the first tool part 40 and the urging surfaces 65. The second tool part adjusters 74 limit linear movement of the second tool part 60. The second tool part adjusters 74 comprise urging elements 75 configurable to act on the second tool part 60. The second tool part adjusters 74 are on the first tool part 40. The second tool part adjustment arrangement 67 comprises opposing second tool part adjusters 74a, 74b. The opposing second tool part adjusters 74a, 74b act to restrict movement in opposing directions. One second tool part adjuster 74a acts on one side of the second tool part 60 and another second tool part adjuster 74b acts on the opposing side.

In the present arrangement, each second tool part adjusters 74 comprises two urging elements 75. However, it will be understood that the number and configuration of the second tool part adjusters 74 may differ. Each urging element 75 is threadingly engaged on the first tool part 40 and has an urging end that acts on the corresponding urging face 65 on the second tool part 60. As such, rotation of the urging element 50 causes the urging element 75 to act on the urging face 65 to urge the second tool part 60 to move in one direction relative to the first tool part 40, or causes the urging element 75 to move away from the urging face 65 to allow the second tool part 60 to move in the opposing direction.

When opposing urging elements 75 are configured to simultaneously act on opposing sides of the second tool part 60, then movement of the second tool part 60 is restricted. Should opposing urging elements 75 be configured to simultaneously be spaced from opposing sides of the second tool part 60, then free movement of the second tool part 60 is allowed.

The second tool part locking arrangement 68 is configured to clamp the second tool part 60 with the first tool part 40. When engaged, the second tool part locking arrangement 68 is configured to prevent relative movement of the second tool part 60 with the first tool part 40. The second tool part locking arrangement 68 is disengagable to selectively allow relative movement between the second tool part 60 and the first tool part 40. The second tool part locking arrangement 68 comprises second tool part clamping bolts 76. The second tool part clamping bolts 76 extend from the first tool part 40. The second tool part clamping bolts 76 protrude through receiving apertures 56 in the first tool part 40. The second tool part clamping bolts 76 upstand from the first tool part locating surface 42. The bolt heads of the second tool part clamping bolts 76 are recessed in the cooperating surface 43 of the first tool part 40 and abut against a collar.

The second tool part clamping bolts 76 are received in second tool part guide slots 77. The second tool part guide slots 77 are elongate. The second tool part guide slots 77 extend parallel to the second tool part guide channels 69. The second tool part guide slots 77 extend perpendicular to the second tool part urging faces 65. As such, the second tool part guide slots 77 allow the second tool part clamping bolts 76 to slide therein when urged to do so. The guide slots 77 may act as or as part of the second tool part guide arrangement 69.

Second tool part clamping nuts 78 engage with the second tool part clamping bolts 76. The second tool part clamping nuts 78 and the second tool part clamping bolts 76 together act as a second tool clamp. The second tool part clamping nuts 78 act on the second tool part locating surface 62. As such, the second tool part locking arrangement 68 is configured to draw the first and second tool parts 40, 60 towards each other and to clamp the first and second tool parts 40, 60 therebetween. When the second tool part 60 is clamped to the first tool part 40, the second tool part 60 is prevented from moving relative to the first tool part 40.

In the embodiments described herein, the second tool part clamping nuts 78 and the second tool part clamping bolts 76 together act as a primary locking arrangement configured to clamp the second tool part 60 against the first tool part 40, and there is provided a secondary locking arrangement 79. The secondary locking arrangement 79 comprises locking elements 79a which are configured to act on the second tool part 60 in a perpendicular direction to the primary locking arrangement. The secondary locking arrangement 79 is configured to act on the second tool part 60 in a perpendicular direction to the adjustment arrangement 67. The locking elements 79a are engagable against the second tool part guide surfaces 66. The locking elements 79a are threaded elements threadingly mounted on the second tool part guide flanges 70 protruding from the first part locating surface 43. As the second tool part guide flanges 70 locate against the second tool part guide surfaces 66, such that the second tool part guide surfaces 66 are slidable thereagainst, then the locking elements 79a are able to protrude from the guide surfaces 66 to engage against the second tool part guide surfaces 66. The secondary locking arrangement 79 may be omitted.

When the second tool part locking arrangement 68 is released, the second tool part 60 is slidable relative to the first tool part 40. Movement of the second tool part 40 is controlled by the second tool part adjusters 74. An adjustment of the second tool part 60 relative to the first tool part 40 may then be easily and accurately controlled. As such, the translational position of the second tool part 60, and therefore the coupling tool 27 mounted on the tool 30 may be accurately determined along an axis extending in the X direction.

Upon the position of the coupling tool 27 being accurately determined and the coupling tool 27 being located in a predetermined position along the axis extending in the X direction, then the position of the coupling tool in that direction may be fixed by engaging the second tool part locking arrangement 68.

Figure 9:
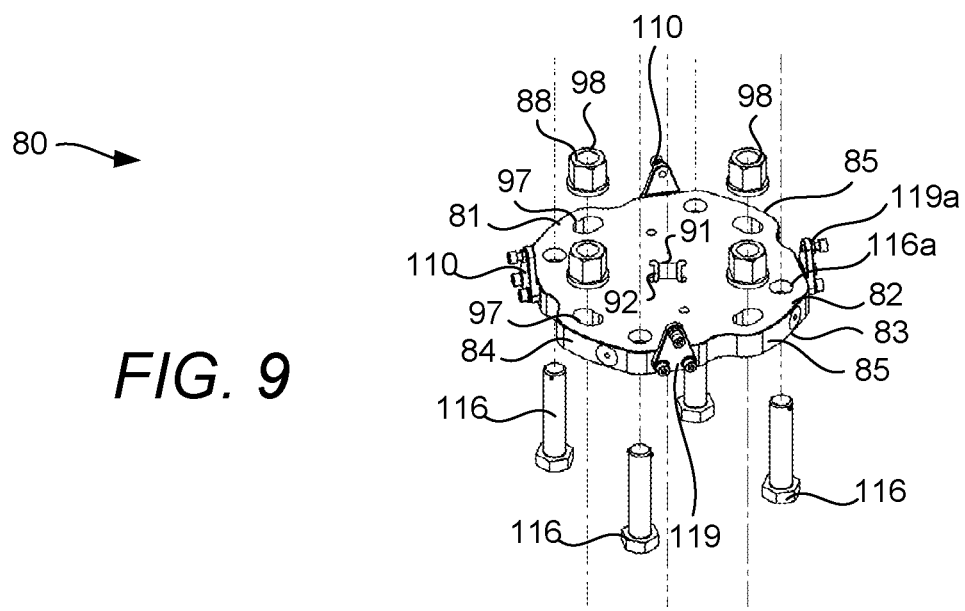
FIG. 9 is a perspective view of a third tool part of the aircraft assembly locating tool shown in FIG. 5.

Referring in particular to FIGS. 5, 8 and 9, the third tool part 80 comprises a third part rigid plate member 81. The third tool part 80 is formed from a suitable material, such as stainless steel. The third part rigid plate member 81 has a third part locating surface 82 and a third part cooperating surface 83. The third tool part locating and cooperating surfaces 82, 83 form opposing faces of the third tool part 80. The third tool part 80 has a third part peripheral face 84. The third part peripheral face 84 extends between the locating and cooperating surfaces 82, 83. The plate member 81 has a thickness between the locating and cooperating surfaces 82, 83. The thickness of the plate member 81 is 30 mm, and optionally in the range of 25 mm to 35 mm.

The tool 30 has a third tool part adjustment arrangement 87. The third tool part adjustment arrangement 87 is configured to act on the third tool part 80 to adjust the position of the third tool part 80 relative to the second tool part 60. The tool 30 has a third part locking arrangement 88. The third tool part locking arrangement 88 is configured to act on the third tool part 80 to prevent movement of the third tool part 80 relative to the second tool part 60. The third tool part 80 abuts with the second tool part 60. The third tool part cooperating surface 83 locates on the second tool part locating surface 63. The third tool part cooperating surface 83 and second tool part locating surface 63 cooperate to allow for the third tool part cooperating surface 83 to slide along the second tool part locating surface 63. In an embodiment, the contact surface of the third part cooperating surface 83 and second tool part locating surface 63 may vary in form.

The third tool part 80 has third tool part urging surfaces 85. The urging surfaces 85 comprise part of the third tool part adjustment arrangement 87. In the present embodiment, the peripheral face 84 of the third tool part 80 defines the urging surfaces 85.

The third tool part adjustment arrangement 87 comprises a third tool part guide arrangement 89. The third tool part guide arrangement 89 comprises a guide pin 90. The guide pin 90 is on the second tool part 60. The guide pin 90 acts as a guide element. The guide pin 90 protrudes from the second part locating surface 63. The guide pin 90 extends in a guide bore 91 in the third tool part 80. The guide pin 90 is rotatable with the third tool part 80. In an alternative embodiment, the third tool part 80 is rotatable about the guide pin 90. A third tool part guide surface 92 is defined by the guide bore 91. The guide bore 91 extends in a direction parallel to the Y axis shown in FIG. 4. As such, the guide pin 90 extends in a direction parallel to the Y axis shown in FIG. 4 when received in the guide bore 91.

The guide pin 90 has a guide head 90a and a guide shaft 90b. The guide head 90a is rotatably received by the second tool part 60. The guide head 90a abuts against a guide shoulder 91a defined in the guide bore 91 to restrict linear movement along the axial direction of the bore 91. When the tool 30 is assembled, the guide head 90a is received between the guide shoulder 91a and the first tool part locating surface 42.

The third tool part guide arrangement 89 restricts movement of the third tool part 80 relative to the second tool part 60 to one degree of freedom. As such, when the third tool part 80 is mounted on the second tool part 60, the third tool part 80 is limited to a rotational movement in a direction about the Y axis shown in FIG. 4. This movement is indicated by arrow A in FIG. 4. The third tool part 80 is slidable about guide pin 90 in a rotational direction about an axis which is perpendicular to the direction of allowable movement of the second tool part 60 relative to the first tool part 40. The third tool part 80 is slidable about guide pin 90 in a rotational direction about an axis which is perpendicular to the direction of allowable movement of the first tool part 40 relative to the support 22

The third tool part adjustment arrangement 87 comprises third tool part adjusters 94. The third tool part adjusters 94 are configured to act on the third tool part 80 to cause selective movement of the third tool part 80 relative to the second tool part 60. The third tool part adjusters 94 act between the second tool part 60 and the third tool part urging surfaces 85. The third tool part adjusters 94 limit rotational movement of the third tool part 80. The third tool part adjusters 94 comprise urging elements 95 configurable to act on the third tool part 80. The third tool part adjusters 94 are on the second tool part 60. The third tool part adjusters 94 act on the third tool part urging surfaces 85. The radial distance between the third tool part urging surfaces 85 and the rotational axis of the third tool part 80 about the guide pin 90 differs along its length. As such, rotation of the third tool part 80 about a central axis defined by the guide pin 90 causes the radial distance of the third tool part urging surfaces 85 at each third tool part adjuster 94 to vary. As such, adjustment of the third tool part adjusters 94 allows for rotation of the third tool part 80 about the second tool part 60 to be limited. Such restriction provides for small angles of adjustment to be achieved.

In the present arrangement, each third tool part adjuster 94 comprises an urging element 95. However, it will be understood that the number and configuration of the third tool part adjusters 94 may differ. Each third tool part urging element 95 is threadingly engaged on the second tool part 60 and has an urging end that acts on the corresponding third tool part urging surface 85 on the third tool part 80. As such, rotation of the third tool part urging element 95 causes the radial distance between the urging end of each urging element 95 to differ and so restrict rotation of the third tool part 80.

When one or more third tool part urging elements 95 are configured to act on the third tool part 80, then movement of the third tool part 80 is restricted. Should each third tool part urging element 95 be configured to be simultaneously spaced from opposing sides of the third tool part 80, then free movement of the third tool part 80 is allowed.

The third tool part locking arrangement 88 is configured to clamp the third tool part 80 with the second tool part 60. When engaged, the third tool part locking arrangement 88 is configured to prevent relative movement of the third tool part 80 with the second tool part 60. The third tool part locking arrangement 88 is disengagable to selectively allow relative movement between the third tool part 80 and the second tool part 60. The third tool part locking arrangement 88 comprises third tool part clamping bolts 96. The third tool part clamping bolts 96 extend from the second tool part 60. The third tool part clamping bolts 96 protrude through receiving apertures 96a in the second tool part 60. The third tool part clamping bolts 96 upstand from the second tool part locating surface 62. Bolt heads of the third tool part clamping bolts 96 are recessed in the cooperating surface 63 of the second tool part 60 and abut against a collar.

The third tool part clamping bolts 96 are received in third tool part guide slots 97. The third tool part guide slots 97 are elongate. The third tool part guide slots 97 extend in a circumferential direction about the central axis defined by the guide pin 90. The third tool part guide slots 97 allow the third tool part clamping bolts 96 to slide therein when urged to do so. The third tool part guide slots 97 may act as or as part of the third tool part guide arrangement 89.

Third tool part clamping nuts 98 engage with the third tool part clamping bolts 96. The third tool part clamping nuts 98 and the third tool part clamping bolts 96 together act as a third tool part clamp. The third tool part clamping nuts 98 act on the third tool part locating surface 82. As such, the third tool part locking arrangement 88 is configured to draw the second and third tool parts 60, 80 towards each other and to clamp the second and third tool parts 60, 80 therebetween. When the third tool part 80 is clamped to the second tool part 60, the third tool part 80 is prevented from moving relative to the second tool part 60.

In the embodiments described herein, the third tool part clamping nuts 98 and the third tool part clamping bolts 96 together act as a primary locking arrangement configured to clamp the third tool part 80 against the second tool part 60. The third tool part urging elements 95 is configured to act as a secondary locking arrangement. The third tool part urging elements 95 are configured to act on the third tool part 80 in a perpendicular direction to the primary locking arrangement. The third tool part urging elements 95, acting as locking elements are engagable against the third tool part 80. The secondary locking arrangement may be omitted.

When the third tool part locking arrangement 88 is released, the third tool part 80 is slidable in a rotational movement relative to the second tool part 60. Movement of the third tool part 80 is controlled by the third tool part adjusters 94. An adjustment of the third tool part 80 relative to the second tool part 60 may then be easily and accurately controlled. As such, the rotational position of the third tool part 80, and therefore the coupling tool 27 mounted on the tool 30 may be accurately determined about an axis extending in the Y direction as shown in FIG. 4.

Upon the position of the coupling tool 27 being accurately determined and the coupling tool 27 being located in a predetermined position about the axis extending in the Y direction, then the position of the coupling tool 27 in that direction may be fixed by engaging the third tool part locking arrangement 88.

Figure 10:
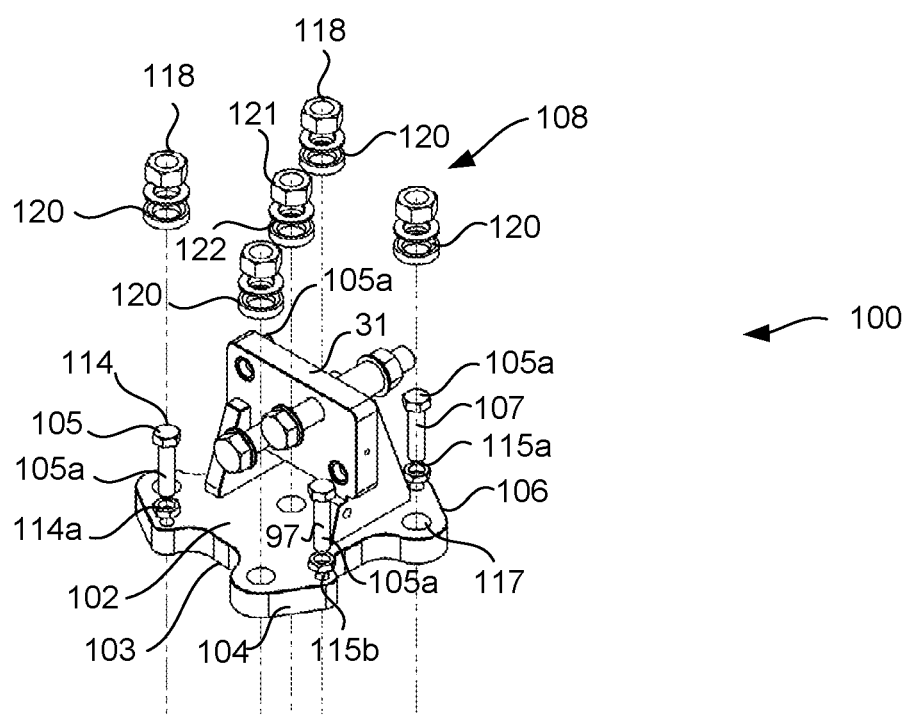
FIG. 10 is a perspective view of a fourth tool part of the aircraft assembly locating tool shown in FIG. 5.

Referring in particular to FIGS. 5, 9 and 10, the fourth tool part 100 comprises a fourth tool part rigid plate member 101. The fourth tool part 100 is formed from a suitable material, such as stainless steel. The fourth tool part rigid plate member 101 has a fourth tool part locating surface 102 and a fourth tool part cooperating surface 103. The fourth tool part locating and cooperating surfaces 102, 103 form opposing faces of the fourth tool part 100. The coupler 31 is on the fourth tool part 100. The coupler 31 extends from the locating surface 102 of the fourth tool part 100.

The fourth tool part 100 has a fourth tool part peripheral face 104. The fourth tool part peripheral face 104 extends between the fourth tool part locating and cooperating surfaces 102, 103. The fourth tool part plate member 101 has a thickness between the fourth tool part locating and cooperating surfaces 102, 103. The thickness of the plate member 101 is 30 mm, and optionally in the range of 25 mm to 35 mm.

The tool 30 has a fourth tool part adjustment arrangement 107. The fourth tool part adjustment arrangement 107 is configured to act on the fourth tool part 100 to adjust the position of the fourth tool part 100 relative to the third tool part 80. The tool 30 has a fourth tool part locking arrangement 108. The fourth tool part locking arrangement 108 is configured to act on the fourth tool part 100 to prevent movement of the fourth tool part 100 relative to the third tool part 80. The fourth tool part 100 is spaced from the third tool part 80. Elements of the fourth tool part extend from the cooperating surface 103 and locate on the third tool part locating surface 83. The fourth tool part cooperating surface 103 and third tool part locating surface 83 are spaced to allow for the fourth tool part 100 to be adjusted relative to the third tool part locating surface 83.

The fourth tool part 100 has urging means 105. The fourth tool part urging means 105 comprise part of the fourth tool part adjustment arrangement 107. The fourth tool part urging means 105 comprise four urging units 105a spaced apart from each other. The number of urging units may differ, however is preferably three or four.

The fourth tool part 100 has guide surfaces 106. The guide surfaces 106 are defined by the peripheral face 104. The fourth tool part adjustment arrangement 107 comprises a fourth tool part guide arrangement 109. The fourth tool part guide arrangement 109 comprises fourth tool part guide flanges 110. The fourth tool part guide flanges 110 are on the third tool part 80. The fourth tool part guide flanges 110 protrude from the third tool part locating surface 83. The fourth tool part guide flanges 110 locate against the fourth tool part guide surfaces 106, such that the fourth tool part guide surfaces 106 are slidable thereagainst.

The fourth tool part guide arrangement 109 also comprises a distal end 90c of the guide pin 90. The distal end 90c of the guide pin 90 extends from the third guide part 80 and is received in a guide aperture 111 in the fourth tool part 100. The guide pin 90 is movably mountable in the guide aperture 111. The guide aperture 111 also aids to locate the fourth guide part 100 relative to the third guide part 80. In the described embodiment, the distal end 90c of the guide pin 90 extends through the fourth tool part 100.

The urging units 105a of the fourth tool part adjustment arrangement 107 each comprise a fourth tool part adjuster 114. The fourth tool part adjusters 114 are configured to act on the fourth tool part 100 to cause selective movement of the fourth tool part 100 relative to the third tool part 80. Each fourth tool part adjuster 114 acts between the fourth tool part 100 and the locating surface 82 of the third tool part 80. The fourth tool part adjuster 114 control linear movement of the fourth tool part 100. The fourth tool part adjusters 114 comprise fourth tool part urging elements 115 configurable to act on the fourth tool part 100. The fourth tool part adjusters 114 are on the fourth tool part 100. The fourth part tool adjusters 114 are in a spaced relationship and are disposed proximal to opposing corners of the fourth tool part 100.

Each fourth tool part urging element 115 is threadingly engaged on the fourth tool part 100. Each fourth tool part urging element 115 is received in a threaded aperture 115b extending between the fourth tool part locating and cooperating surfaces 102, 103. Each fourth tool part urging element 115 has an urging end 115a that is configured to protrude from the co-operating surface 103 of the fourth tool part 100. The urging end 115a is configured to act on the corresponding locating surface 82 of the third tool part 80, acting as an urging face. As such, rotation of the fourth tool part urging element 115 causes the fourth tool part urging element 115 to act on the third tool part 80 to urge that section of the fourth tool part 100 to move towards or away from relative to the third tool part 80. Limiting elements 114a limit the rotation of the urging elements 115 and so limit the extent by which each urging element 115 protrudes from the fourth tool part 100.

The fourth tool part locking arrangement 108 is configured to clamp the fourth tool part 100 with the third tool part 80. When engaged, the fourth tool part locking arrangement 108 is configured to prevent relative movement of the fourth tool part 100 with the third tool part 80. The fourth tool part locking arrangement 108 is disengagable to selectively allow relative movement between the fourth tool part 100 and the third tool part 80. The fourth tool part locking arrangement 108 comprises fourth tool part clamping bolts 116. The fourth tool part clamping bolts 116 extend from the third tool part 80. The fourth tool part clamping bolts 116 protrude through receiving apertures 116a in the third tool part 80. The fourth tool part clamping bolts 116 upstand from the third tool part locating surface 82. Bolt heads of the fourth tool part clamping bolts 116 are recessed in the cooperating surface 83 of the third tool part 80 and abut against a collar.

The fourth tool part clamping bolts 116 are received in fourth tool part guide holes 117. The fourth tool part guide holes 117 are circular. The axes of the fourth tool part guide holes 117 extend parallel to the axes of the threaded aperture 115b extending between the fourth tool part locating and cooperating surfaces 102, 103. The guide holes 117 may act as or as part of the fourth tool part guide arrangement 109.

The fourth tool part guide arrangement 109 restricts movement of the fourth tool part 100 relative to the third tool part 80 to three degrees of freedom. As such, when the fourth tool part 100 is mounted on the third tool part 80, the fourth tool part 100 is limited to a translation in a direction parallel to the Y axis shown in FIG. 4, to a pitch movement in a rotational direction shown by arrow B and a roll movement in a rotational direction shown be arrow C.

Fourth tool part clamping nuts 118 engage with the fourth tool part clamping bolts 116. The fourth tool part clamping nuts 118 and the fourth tool part clamping bolts 116 together act as a fourth tool clamp. The fourth tool part clamping nuts 118 act on the fourth tool part locating surface 102. A spherical washer 120 is disposed between each fourth tool part clamping nut 118 and the fourth tool part locating surface. The spherical washer 120 compensates for the angular orientation of the fourth tool part locating surface 102 to allow for the pitch and roll of the fourth tool part 100. As such, the fourth tool part locking arrangement 118 is configured to draw the third and fourth tool parts 80, 100 towards each other and to clamp the first and second tool parts 80, 100 therebetween.

In the described embodiment, the fourth tool part locking arrangement 118 further comprises a guide pin locking nut 121. The guide pin locking nut 121 mounts to the guide pin 90. The guide pin locking nut 121 is threadingly engaged with the guide pin 90. The guide pin locking nut 121 engages with the distal end 90c of the guide pin 90 extending from the fourth tool part 100. The guide pin locking nut 121 acts on the fourth tool part locating surface 102. A guide pin spherical washer 122 is disposed between the guide pin locking nut 121 and the fourth tool part locating surface 102. The guide pin locking nut 121 and guide pin 90 form part of the fourth tool part locking arrangement 118. However, the guide pin locking nut 121 may be omitted.

The fourth tool part adjusters 114 act in an opposing direction to the fourth tool part locking arrangement 108 to restrict the extent to which the third and fourth tool parts 80, 100 may be brought together. As such, the fourth tool part adjusters 114 provide for axial spacing and pitch and roll adjustment between the third and fourth tool parts 80, 100. When the fourth tool part 100 is clamped to the third tool part 80, the fourth tool part 100 is prevented from moving relative to the third tool part 80.

In the embodiments described herein, the fourth tool part clamping nuts 118 and the fourth tool part clamping bolts 116 together act as a primary locking arrangement configured to clamp the fourth tool part 100 and the third tool part 80 in a spaced relationship. There is also provided a secondary locking arrangement 119. The secondary locking arrangement 119 comprises locking elements 119a which are configured to act on the fourth tool part 100 in a perpendicular direction to the primary locking arrangement. The secondary locking arrangement 119 is configured to act on the fourth tool part 100 in a perpendicular direction to the adjustment arrangement 107. The locking elements 119a are threaded elements threadingly mounted on the fourth tool part guide flanges 110 protruding from the third tool part locating surface 83. The locking elements 119a protrude to engage against the fourth tool part 100. The secondary locking arrangement 119 may be omitted.

When the fourth tool part locking arrangement 108 is released, the fourth tool part 100 is adjustable relative to the third tool part 80. Movement of the fourth tool part 100 is controlled by the fourth tool part adjusters 114. An adjustment of the fourth tool part 100 relative to the third tool part 80 may then be easily and accurately controlled. As such, the translational position of the second tool part 60 in the Y direction, as well as pitch and roll movements may be accurately determined, and therefore the position of the coupling tool 27 mounted on the tool 30 may be accurately determined.

Upon the position of the coupling tool 27 being accurately determined and the coupling tool 27 being located in a predetermined position along the axis extending in the Y direction, and/or rotation about an axes parallel to the X and Z axes, then the position of the coupling tool in that direction may be fixed by engaging the fourth tool part locking arrangement 118.

It will be understood that each of the tool parts may be adjusted relative to another of the adjacent tool parts independently of each of the other tool parts. As such, the degrees of freedom of movement are limited during adjustment of the tool 30. Therefore, it is possible to accurately set the tool 30 in order to achieve the required level of accuracy and tolerances. Adjustment along all six degrees of freedom is possible. At the same time, it is possible to lock movement of each tool part relative to each of the other tool parts to prevent any movement during assembly of the aircraft assemblies. With the arrangement described herein it is possible to securely hold the aircraft assembly using the tool 30 with the required forces acting through the tool 30.

As described above, the first tool part 40 acts as a base tool part, and the second tool part 60 acts as a positionable tool part. However, it will be understood that any two adjacent tool parts may act respectively as a base tool part and a positionable tool part. The two adjacent tool parts acting as a base tool part and a positionable tool part will have a corresponding locking arrangement and adjustment arrangement. For example, the third tool part 80 may act as a base tool part, and the fourth tool part 100 may act as a positionable tool part, or the second tool part 60 may act as a base tool part, and the third tool part 80 may act as a positionable tool part.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft component locating tool for locating an aircraft component during assembly of an aircraft comprising: first, second, and third stacked plates; the first stacked plate being configured to mount on a support, a first plate adjustment arrangement configured to act on the first stacked plate to adjust a position of the first stacked plate relative to the support along a first one degree of freedom; a first plate locking arrangement configured to selectively lock the first stacked plate in a position on the support; a second plate adjustment arrangement configured to act on the second stacked plate to adjust a position of the second stacked plate on the first stacked plate along a second one degree of freedom; and a second plate locking arrangement configured to selectively lock the second stacked plate in a position on the first stacked plate; a third plate adjustment arrangement configured to act on the third stacked plate to adjust a position of the third stacked plate on the second stacked plate along a third one degree of freedom; a third plate locking arrangement configured to selectively lock the third stacked plate in a position on the second stacked plate; and an interface arrangement including a coupler configured to mount with an aircraft component, the interface arrangement being configured to be fixed to the third stacked plate so as to move with the third stacked plate relative to the first and second stacked plates.

2. The aircraft component locating tool of claim 1, wherein the second plate adjustment arrangement comprises a second plate guide arrangement configured to guide movement of the second stacked plate relative to the first stacked plate.

3. The aircraft component locating tool of claim 1, wherein the third plate adjustment arrangement comprises a third plate guide arrangement configured to guide movement of the third stacked plate relative to the second stacked plate.

4. The aircraft component tool of claim 3, wherein the second plate locking arrangement is configured to urge the second stacked plate against the first stacked plate.

5. The aircraft component locating tool of claim 4, wherein the second plate locking arrangement is a primary locking arrangement configured to urge the second stacked plate against the first stacked plate and the tool comprises a secondary locking arrangement configured to act in a perpendicular direction to the primary locking arrangement and the adjustment arrangement.

6. The aircraft component locating tool of claim 1, wherein the second plate adjustment arrangement is configured to adjust the position of the second stacked plate relative to the first stacked plate along one of a translational movement and a yaw movement, and the third plate adjustment arrangement is configured to adjust the position of the third stacked plate relative to the second stacked plate along the other of a translational movement and a yaw movement.

7. The aircraft component locating tool of claim 1, further comprising a fourth stacked plate movable relative to the first, second and third stacked plates, wherein the interface arrangement is configured to move with the fourth stacked plate relative to the third stacked plate.

8. The aircraft component locating tool of claim 7, further comprising a fourth locking arrangement configured to selectively lock the fourth stacked plate in a position on the third stacked plate, and a fourth plate adjustment arrangement configured to act on the fourth stacked plate to adjust the position of the fourth stacked plate relative to the third stacked plate.

9. The aircraft component locating tool of claim 8, wherein the fourth plate adjustment arrangement is configured to adjust the position of the fourth stacked plate relative to the third stacked plate along a pitch and/or roll movement.

10. The aircraft component locating tool of claim 3, wherein the second plate locking arrangement is configured to act in a perpendicular direction to the second plate adjustment arrangement.

11. The aircraft component locating tool of claim 1, wherein the third plate locking arrangement is configured to act in a perpendicular direction to the third plate adjustment arrangement.

12. The aircraft component locating tool of claim 11, wherein the third plate locking arrangement is configured to urge the third stacked plate against the second stacked plate.

13. The aircraft component locating tool of claim 12, wherein the third plate locking arrangement is a primary locking arrangement configured to urge the third stacked plate against the second stacked plate and the tool comprises a secondary locking arrangement configured to act in a perpendicular direction to the primary locking arrangement and the adjustment arrangement.

* * * * *